United States Patent [19]
Bresman

[11] 4,158,821
[45] Jun. 19, 1979

[54] LASER GAIN TUBE

[75] Inventor: Joseph M. Bresman, West Hartford, Conn.

[73] Assignee: United Technologies Corporation, Hartford, Conn.

[21] Appl. No.: 864,951

[22] Filed: Dec. 27, 1977

[51] Int. Cl.² .............................................. H01S 3/097
[52] U.S. Cl. .......................... 331/94.5 D; 331/94.5 G; 331/94.5 PE
[58] Field of Search .................. 331/94.5 D, 94.5 PE, 331/94.5 C, 94.5 G; 356/106 LR

[56] References Cited
U.S. PATENT DOCUMENTS 3,606,549  9/1971  Coccoli et al. ................ 356/106 LR Primary Examiner—William L. Sikes
Attorney, Agent, or Firm—Lawrence A. Cavanaugh

[57] ABSTRACT

An improved laser gain tube for use in a differential laser gyro is disclosed. The gain tube comprises a housing having a cathode located therein with a pair of chambers located within the cathode, a pair of discharge tubes extending from anode regions on each side of the cathode into each of the chambers and means for providing an electrical discharge within the chambers. An aperture positioned between the chambers is adapted to provide optical communication therebetween while maintaining electrical isolation of an electrical discharge in each chamber. The chamber walls are adapted for maintaining the discharge with a current density below the threshold for cathode sputtering.

19 Claims, 4 Drawing Figures

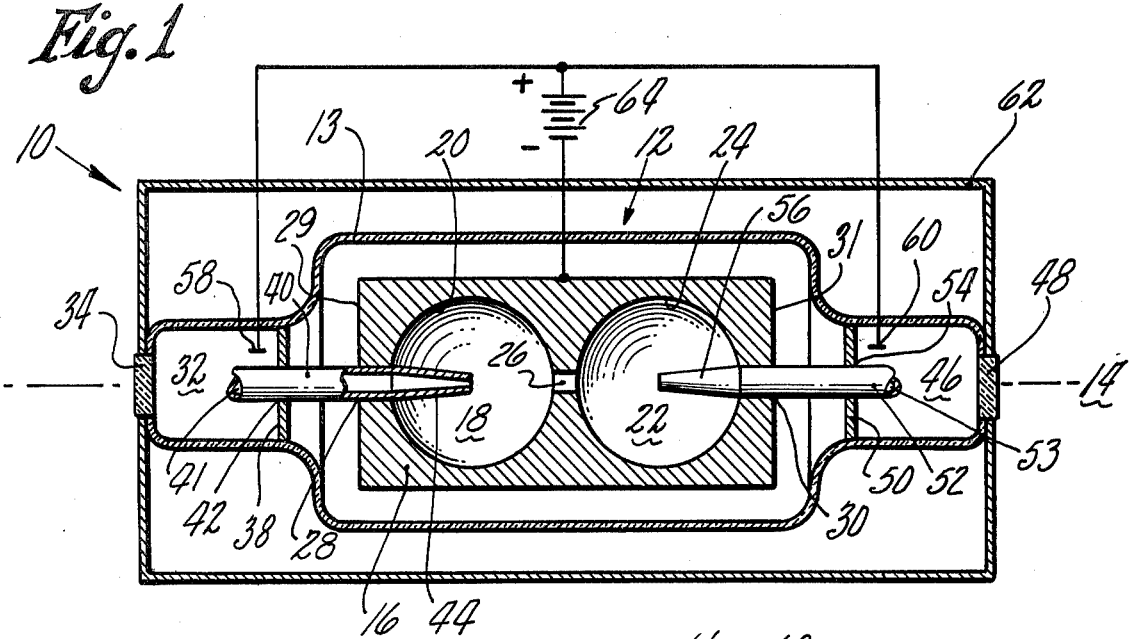
Fig.1
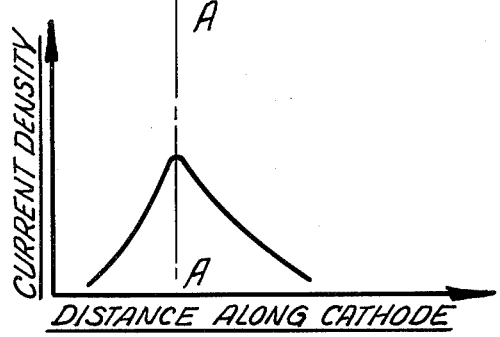
Fig.4
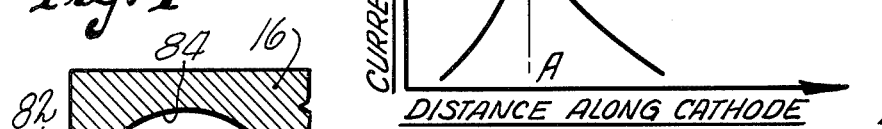
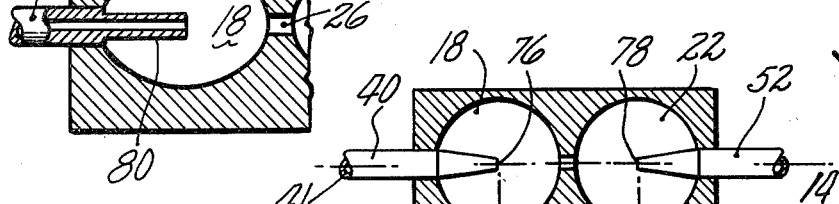
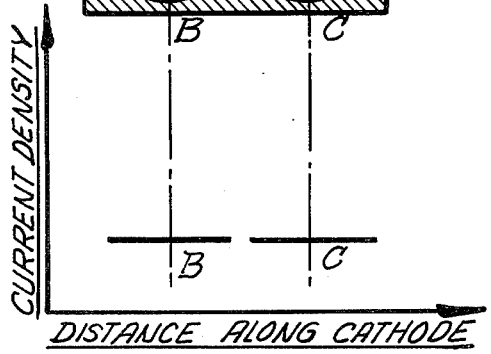
Fig.2 PRIOR ART
Fig.3

IMPROVED LASER GAIN TUBE

The invention herein described was made in the course of or under a contract or subcontract thereunder with the Department of the Navy.

BACKGROUND OF THE INVENTION

Field of the Invention

This invention relates to electrode configurations for gas discharge devices and more particularly to an electrode configuration adapted for providing a laser gain medium having dual discharges for use in a differential laser gyro.

Ring type lasers employing electromagnetic waves at optical or near optical frequencies traveling in both a clockwise and a counter-clockwise direction about a closed path in a principal plane, have been utilized to sense rates of angular rotation similar in function to the well known electromechanical gyro. The rotation of the gyro requires more time for a traveling wave to complete the optical path in the direction of rotation and requires less time for a traveling wave to complete the optical path in a direction opposite to the direction of rotation. Thus, if the gyro is rotating in the same direction as the clockwise beam, the frequency of the clockwise beam will appear to be less than a natural frequency of the laser, whereas the frequency of the counter-clockwise will seem to be higher. The difference between the two frequencies is a function of the rate of rotation of the gyro.

Laser gyros typically impose severe restraints on the gain tube of the laser. The gain tube must typically have small dimensions for incorporation within one leg of the ring laser. Additionally, the gain tube is typically enclosed within a gyro block having a low distortion coefficient, such as the coefficient of expansion, and having poor heat transfer characteristics. The heat generated within the gain tube during operation must be efficiently extracted through the gyro block to minimize frequency distortions in the clockwise and counter-clockwise waves. Since the gyro block has poor heat transfer characteristics, the gain tube must be designed to produce a miniumum amount of heat during operation to avoid distortion of the tube and plasma instabilities within the gain medium resulting in frequency distortions.

Additionally, the clockwise and counter-clockwise waves tend to mode lock, that is, the waves interfere with one another to produce waves having identical frequencies. In addition, one of the traveling waves, by virtue of intrinsic or momentary power loss within the gain medium, may achieve dominance over the other waves and deplete the gain population sufficiently to extinguish the other traveling waves. This effectively results in a deadband for low angular rates of the gyro.

To reduce the probability of interactions occurring between the modes, it is necessary to operate the gain tube with a lasing gas having a low pressure. This is particularly true when the lasing gas is a mixture of helium and neon. Additionally, the low pressure also reduces broadening of the lasing lines which contributes to improved performance and minimizes laser frequency shift resulting from gas pressure variations within the gain area. However, in prior art devices low pressure operation of gain tubes typically resulted in cathode sputtering which seriously degraded the gain tube lifetime. Cathode sputtering is further enhanced by the high current densities incident onto the cathodes resulting from the small effective surface area of the cathode which is required to obtain a gain tube having small dimensions.

One method well known in the art of increasing the effective surface area of a cathode and thereby reducing the current density is the utilization of a hollow cylindrical cathode with a discharge tube extending partly into the cylindrical cathode symmetrically about a longitudinal axis of the cylinder. In operation, the discharge flows from an anode exterior to the discharge tube, through an inner passage within the tube to the interior cylindrical wall of the cathode. The discharge tube extends partly into the cylindrical cathode to reduce sputtering which may occur at the ends of the cylinder. The interior diameter of the cylinder is sized to have an effective surface area sufficient to produce a low surface current density incident thereon. This configuration results in some reduction in the current density incident onto the cathode surface but a high current density persists on that portion of the cathode surface in close proximity to the end of the discharge tube resulting in a relatively high rate of cathode sputtering with a corresponding gain tube deterioration.

SUMMARY OF THE INVENTION

An object of the present invention is to provide a laser gain tube having an improved lifetime and adapted for providing a stable gain medium.

According to the present invention a laser gain tube comprises a housing having a longitudinal axis, a cathode disposed within the housing having a first chamber and a second chamber enclosed therein and interconnected through an aperture, a first tube disposed about the longitudinal axis and extending through a first entrance at one end of the cathode into the first chamber, a second tube disposed about the longitudinal axis and extending through a second entrance at the other end of the cathode into the second chamber, means for ionizing a gas within the housing to provide a laser gain medium; and means for passing electromagnetic radiation through the housing.

A feature of the present invention is a metallic cathode disposed within the housing symmetrically about the longitudinal axis. The first and second chambers within the cathode have boundaries defining the cathode surface of the electrode configuration. Also, a first anode region located at one end of the housing is adapted for applying an electric potential to the gas within the first chamber. A first tube having a bore centrally disposed therein extends from the first anode region into the first chamber through the first entrance. Additionally, a second anode region located at the other end of the housing is adapted for applying an electric potential to the gas within the second chamber. A second tube having a bore centrally disposed therein extends from the second anode region into the second chamber through the first entrance. Additionally, the first and second tubes extend substantially into the center of the first and second chambers respectively. The portion of the tubes extending into the first and second chambers have a wall thickness which tapers within the chamber decreasingly toward the center of the chamber to minimize obstruction of an electrical discharge within the chambers. The aperture interconnecting the first and second chambers has a diameter sufficient to allow a laser beam to pass therethrough but sufficiently small to inhibit an electrical discharge within one chamber from mixing with an electrical discharge within the second chamber. In one embodiment, the chambers have a spherical shape adapted for producing substantially uniform discharges having low current densities on the cathode surface. A further embodiment includes chambers having ellipsoidal configurations to further reduce the current density on the cathode surface.

The cathode has an external configuration of a cylindrical rod and is enclosed in a housing, typically of quartz. Separators are fixedly attached to an interior wall of the housing and to the first and second tubes to define the first and second anode region within each end of the housing. A first anode disposed within the first anode region is adapted for providing an electrical discharge within the gas in the first anode region, the first tube and the first chamber. Additionally, a second anode disposed within the second region is adapted for providing an electrical discharge within the gas in the second anode region, the second tube and the second chamber. A first and second window having anti-reflective coatings are positioned within the ends of the housing in the first and second anode regions respectively, substantially symmetrical about the longitudinal axis and are in optical line of sight communication with each other through the bore of the first and second tubes and the aperture between the first and second chambers.

An advantage of the present invention is the elimination of relaxation oscillations between the dual discharges. Additionally, high current density points along the cathode surface are eliminated thereby increasing the gain tube lifetime. Also, the aperture between the first chamber and the second chamber can be sized to control off axis modes within the clockwise and counter-clockwise traveling waves. Additionally, the cathode surfaces provide good heat transfer characteristics for maintaining the cathodes at a relatively low temperature. Also, the cathode configuration is adapted for maintaining the discharge with a relatively low voltage source and the direction of the discharge within the chambers eliminates gyro bias shifts resulting from Langmuir flow effects.

The foregoing and other objects, features and advantages of the present invention will become more apparent in the light of the following detailed description of the preferred embodiment thereof as illustrated in the accompanying drawing.

BRIEF DESCRIPTION OF THE DRAWING

FIG. 1 is a simplified schematic diagram of the present invention showing the major elements of the invention;

FIG. 2 is a simplified schematic of a prior art cathode with a corresponding curve of the current density distribution along the length of the cathode;

FIG. 3 is a simplified cross-sectional view of the cathode configuration of the present invention with a corresponding curve of the current density distribution along the longitudinal axis of the cathode; and FIG. 4 is a simplified view of an embodiment of the present invention.

DESCRIPTION OF THE PREFERRED EMBODIMENT

Referring now to FIG. 1 which shows a simplified schematic diagram of a laser gain tube 10 having a housing 12, with a wall 13 preferably made of insulating material, such as quartz, having a longitudinal axis 14, a cathode 16 centrally disposed within the housing symmetrically about the longitudinal axis having a first chamber 18 disposed within the cathode and defined by a spherical interior wall 20, a second chamber 22 disposed within the cathode and defined by a spherical interior wall 24, an aperture 26 symmetrically disposed about the longitudinal axis 14 interconnecting the first chamber 18 and the second chamber 22, wherein the first chamber and the second chambers are symmetrically disposed about the longitudinal axis. A first entrance 28 extends from a first end 29 of the cathode to the first chamber, and a second entrance 30 extends from a second end 31 of the cathode 16 to the second chamber 22. A first anode region 32 located within one end of the housing includes a first window 34 located within the housing wall 13 and disposed in a perpendicular relationship to the longitudinal axis 14. The first window has an anti-reflective coating deposited thereon. A first separtor 38 located within the housing is fixedly attached to the housing wall 13 to provide electrical isolation between the first anode region and the cathode and cooperates with the housing wall to define the first anode region 32. A first tube 40 positioned within the housing extends from within the first anode region 32 through a first opening 42 within the first separator and through the first entrance 28 into the central portion of the first chamber 18. The end portion 44 of the first tube extending into the first chamber 18 has a wall thickness which tapers along the horizontal axis 14 toward the center of the first chamber in a decreasing manner. A second anode region 46 located within a second end of the housing includes a second window 48 located within the housing wall 13 and disposed in a perpendicular relationship to the longitudinal axis 14. The second window has an anti-reflective coating deposited thereon. A second separator 50 located within the housing is fixedly attached to the housing wall 13 to provide electrical isolation between the second anode region and the cathode and cooperates with the housing wall to define the second anode region 46, a second tube 52 positioned within the housing extends from within the second anode region 46 through a second opening 54 within the second separator and through the second entrance 30 into the central portion of the second chamber 22. The end portion 56 of the second tube extending into the second chamber has a wall thickness which tapers along the horizontal axis 14 towards the center of the second chamber in a decreasing manner. A first electrode 58 is located within the first anode region 32 and a second electrode 60 is located within the second anode region 46 and both are adapted for applying an electric potential between the anode regions and the cathode. A magnetic shield 62 encloses the housing to eliminate Zeeman effects.

In operation, the laser gain tube is enclosed within a gyro block (not shown) within one leg of a ring laser (not shown). The gain tube contains a mixture of helium-neon gas, typically having a ratio of 7:1 or 9:1 with a total pressure of less than three torr, which is ionized by an electric potential maintained between the first anode region and the cathode and between the second anode region and the cathode to provide a gain medium within the gain tube. The low pressure of the helium-neon gas mixture and the electrode configuration enables the electrical discharge producing the ionization to be maintained at a relatively low voltage, typically less than five hundred volts. In normal operation, a power supply 64 maintains the first and second electrodes at a positive potential with the cathode grounded. This electrical arrangement produces current flow in opposite directions through the ionized gas in each of the chambers. Since a direct current electrical discharge is known to cause Langmuir flow within a plasma, which flow produces a bias shift in a gyro reading, the dual discharge is maintained with two identical discharges having matched current flows in opposite direction. The resulting Langmuir flow within each of the cavities is in opposite directions producing self-canceling bias effects.

A first electric discharge path within the present apparatus extends from the first electrode within the first anode region through a bore 41 within the first tube into the first chamber. A second electric discharge path extends from the second electrode in the second anode region through a bore 53 within the second tube into the second chamber. The aperture 26 between the first and second chamber is sized to be sufficiently small to inhibit mixing of the discharges in each chamber and large enough to allow traveling waves of electromagnetic radiation to pass therethrough. Typically, the aperture has a diameter less than two millimeters.

In operation, the gain tube, typically located within one leg of a ring laser, provides an optical gain medium to the traveling electromagnetic waves rotating in the clockwise and counter-clockwise direction through the bores within the first and second tubes, through the first and second chambers and through the aperture 26 positioned between the first and second chambers. The first and second windows have anti-reflective coatings for use with electromagnetic radiation characteristic of a helium-neon gain medium. The windows are positioned perpendicular to the longitudinal axis 14 and essentially perpendicular to the path of the traveling electromagnetic waves to permit circular polarization to the traveling waves.

It is to be recognized that the aperture 26 may be sized to provide spatial filtering of the traveling waves to eliminate off axis modes from oscillating within the laser. The position of the aperture within the discharge region is ideally suited for spatial filtering.

In a gas discharge, operating in the normal discharge region, i.e., with a total current of the order of milliamperes, typically only a portion of the cathode is utilized. The proportion utilized is a function of the current dispositon into the gas. As the current deposition increases, the area of cathode participating in the discharge increases to maintain a substantially constant current density at the cathode with substantially no increase in voltage. When the cathode surface is completely covered by the discharge, further increases in the current produce a voltage rise resulting in an abnormal discharge and plasma instabilities.

With prior art devices, it is known that discharges having high current deposition into the gas can be obtained utilizing hollow cathode techniques. When two cathodes are positioned relatively close to one another, the negative glow regions of the discharge near each cathode flow together. This results in the ability to substantially increase the current deposition into the gas. Increases of a factor of one hundred are possible. The positive ions formed within the gas by the electrons emitted from the cathode can travel to either cathode resulting in a much smaller recombination loss. Additionally, increased voltage is not required to sustain the discharge. This effect is especially pronounced for a discharge within a cylindrical cathode.

High current operation of a gain tube is desirable to maximize the gain of the gas medium within the gain tube. High current operation in prior art devices having cylindrical cathodes results in excessive cathode sputtering which limits the gain tube lifetime due to gas cleanup. FIG. 2 shows a portion of a prior art gain tube 66, having a cylindrical cathode 68 and a discharge tube 70. The tube extends into the interior of the cylindrical cathode along a longitudinal axis 72 to a position A. During operation, the current deposited into the gas flows through the discharge tube 70 to the walls of the cylindrical cathode resulting in a current density distribution along the cathode as shown in the lower half of FIG. 2. The current density has a maximum at the position A within the cathode corresponding to the position of the end of the discharge tube 70 within the cylinder. The high current density impinging on the cathode produces excessive cathode sputtering in the area of the cathode surrounding the end of the discharge tube producing deterioration of the gain tube and resulting in a short lifetime of the tube. Longer tube lifetimes are possible by increasing the inner diameter of the cathode. The extent of the increase possible is limited by size restrictions on the gain tube.

FIG. 3 shows a simplified view of the cathode of the present invention as shown in FIG. 1. A first discharge is maintained in the first chamber 18 with the current flowing through the first tube 40 into the first chamber 18 to the interior wall 20 defining the cathode surface within the first chamber. The interior wall is disposed symmetrically about the exit 76 of the first tube resulting in a substantially uniform flow of current to the interior wall. Due to the spherical shape of the chamber and the tapered shape of the tube, substantially all of the surface area participates in the discharge resulting in a relatively low current density at the surface. Cathode sputtering is significantly reduced resulting in an improved gain tube lifetime. Lifetimes, typically of approximately two thousand hours are obtainable. Additionally, the cathode configuration yields a superior hollow cathode effect which results in a low voltage, typically less than five hundred volts, to sustain the discharge. An identical discharge phenomena exists within the second chamber. The exit 76 of the first tube 40 is located at the approximate center of the first chamber at a position B and an exit 78 of the second tube 52 is located at the approximate center of the second chamber at a position C. The current density within each chamber as a function of distance along the cathode is shown in the lower half of FIG. 3. The current density is relatively constant as a function of position along the axis.

It is to be recognized that methods well known in the art may be utilized to further reduce cathode sputtering and increase the electron emission from the cathode. For a cathode constructed of aluminum, as in the preferred embodiment of the present invention, a thin layer of aluminum oxide deposited on the interior walls 20, 24 in the first and second chambers 18 and 22 respectively, will enhance electron emission and reduce cathode sputtering.

The aperture 26 is sized to inhibit the dual discharges maintained in each of the chambers from intermixing with one another. This eliminates plasma instabilities, such as relaxation oscillations found in prior art dual discharge devices, produced by the intermixing of the discharges. Normal oscillations found in helium-neon discharges, such as striations, can be eliminated by properly selecting the pressure of the gas within the gain tube to levels less than approximately three torr.

The overall characteristics of a typical gain tube in accordance with the present invention as shown in Table I.

TABLE I

| Dimensions of Gain Tube | |
|---|---|
| Shape | Cylindrical |
| Length | 4–5 inches |
| Diameter | 0.880 inches |
| Discharge Characteristics | |
| Langmuir Flow | Balanced |
| Plasma Oscillation | Not in Operating Range |
| Gas Characteristics | |
| Gases | Helium-Neon |
| Pressure | 2.7 Torr |
| Ratio of Gases | 9:1 Helium/Neon |
| Electrical Characteristics | |
| Power Consumption | 2.1 watts at full power |
| Voltage | 430 volts |
| Gain Tube Lifetime | 2000 hours at full power |

The tube portion extending within the chamber as shown in FIGS. 1 and 3, must be shaped to minimize blockage of the discharge between the end of the tube and the wall sections in the regions about the first and second entrance. The tapered tube of the preferred embodiment provides minimium blockage while maintaining a sufficient wall thickness for structural integrity.

FIG. 4 shows an embodiment of the present invention wherein the end portion 80 of the first tube extending within the first chamber has a diameter less than the diameter of the portion 82 of the tube located outside the cathode. This configuration also minimizes blockage of the cathode surfaces by the tube. A similarly shaped tube would also be located in the second chamber.

Although the embodiment of the present invention, shown in FIG. 1 has first and second spherical walls, it is to be recognized that elliptically shaped walls 84, as shown in FIG. 4, may also be utilized. In addition, the walls may be configured to match the current distribution within the chambers. The gain tube, in accordance with the present invention, is easily placed and aligned within a ring laser and can be easily replaced after failure or for routine maintenance.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. An improved laser gain tube comprising:
a housing having a longitudinal axis;
a cathode disposed within the housing;
a first chamber located within the cathode having a first entrance extending from one end of the cathode to the first chamber;
a second chamber located within the cathode having a second entrance extending from the other end of the cathode to the second chamber wherein the first and second chambers are interconnected through an aperture positioned therebetween;
a first tube having a bore centrally located therein disposed about the longitudinal axis extending through the first entrance into the first chamber;
a second tube having a bore centrally located therein disposed about the longitudinal axis extending through the second entrance into the second chamber;
means for ionizing a gas within the housing to provide a laser gain medium; and
means for passing electromagnetic radiation through the housing.

2. The invention in accordance with claim 1 further including:
a first anode region within one end of the housing interconnected with the first chamber through the core centrally located within the first tube; and
a second anode region within the other end of the housing interconnected with the second chamber through the bore centrally located within the second tube.

3. The invention in accordance with claim 2 wherein the means for ionizing the gas within the housing comprises:
a first electrode disposed within the first anode region adapted for applying an electric potential between the first electrode and the cathode to ionize the gas within the first anode region, the bore of the first tube, and the first chamber; and
a second electrode located within the second anode region adapted for applying an electric potential between the second electrode and the cathode to ionize the gas within the second anode region, the bore of the second tube, and the second chamber.

4. The invention in accordance with claim 2 wherein the first anode region is defined by an interior housing wall and a first separator fixedly attached to the interior housing wall at one end of the housing and to the first tube; and
the second anode region is defined by the interior housing wall and a second separator fixedly attached to the interior wall at the other end of the housing and to the second tube.

5. The invention in accordance with claim 1 wherein the first and second chambers within the cathode are defined by interior walls having a spherical shape.

6. The invention in accordance with claim 1 wherein the first and second chambers within the cathode are defined by interior walls having an ellipsoidal shape.

7. The invention in accordance with claim 1 wherein the housing contains helium-neon gas at a pressure of less than three torr.

8. The invention in accordance with claim 7 wherein the helium-neon gas has a ratio of helium to neon between 7:1 and 9:1.

9. The invention in accordance with claim 1 further including a magnetic shield disposed symmetrically about the housing.

10. The invention in accordance with claim 2 wherein the means for passing electromagnetic radiation through the housing comprises, a first window positioned in the housing wall within the first anode region symmetrically disposed about the longitudinal axis; and
a second window positioned within the housing wall within the second anode region symmetrically disposed about the longitudinal axis wherein the first window and the second window are in optical line of sight communication with each other through the bore in the first and second tubes, and through the aperture between the first and second chamber.

11. The invention in accordance with claim 10 wherein the first and second windows positioned within the housing wall symmetrically about the longitudinal axis are disposed in a perpendicular relationship to the longitudinal axis and adapted for providing circular polarization to the traveling waves passing therethrough.

12. The invention in accordance with claim 11 further including anti-reflective coatings on the first and second windows.

13. The invention in accordance with claim 1 wherein the first and second tubes extend to the center of the first and second chambers.

14. The invention in accordance with claim 1 wherein a portion of the tube extending into the first and second chambers has a wall thickness which tapers within the chambers in a decreasing manner along the longitudinal axis from the first and second entrance to the center of the first and second chamber respectively.

15. The invention in accordance with claim 2 wherein a portion of the tube extending into the first and second chambers has a wall thickness less than the wall thickness of the portion of the tube within the first and second anode regions.

16. The invention in accordance with claim 1 wherein the aperture interconnecting the first and second chamber is adapted for inhibiting intermixing of an electrical discharge within the first and second chamber while allowing traveling waves of electromagnetic radiation to pass therethrough.

17. The invention in accordance with claim 16 wherein the aperture has a diameter less that 0.2 centimeters.

18. The invention in accordance with claim 1 wherein the cathode is metallic having a configuration of a cylindrical rod.

19. The invention in accordance with claim 18 wherein the metallic cathode is made of aluminum.

* * * * *